United States Patent [19]

Streck

[11] 4,430,091

[45] Feb. 7, 1984

[54] OXIDATION BASE DYE COMPOSITION AND METHOD OF DYEING THEREWITH

[76] Inventor: Clemens Streck, 12 Upper Loudon, Loudonville, N.Y. 12211

[21] Appl. No.: 379,629

[22] Filed: May 19, 1982

[51] Int. Cl.³ .............................................. D06P 3/80
[52] U.S. Cl. ........................................ 8/523; 8/589; 8/649
[58] Field of Search ........................... 8/523, 589, 649

[56] References Cited

U.S. PATENT DOCUMENTS 3,494,715  2/1970  Streck ..................................... 8/523

*Primary Examiner*—A. Lionel Clingman
*Attorney, Agent, or Firm*—Samson B. Leavitt; Michael A. Leavitt

[57] ABSTRACT

A dye solution for coloring a substrate, especially porous stone, comprising an oxidation base, acetic acid, and about 0.02 to about 0.3 mole, per mole of said oxidation base, of a $C_{8-16}$ alkyl benzene sulfonic acid, especially dodecyl benzene sulfonic acid, in a volatile organic solvent medium, and a method of coloring a porous substrate therewith involving post-treatment with an oxidizing agent, especially aqueous hydrogen peroxide of about 1 to about 9 wt. % concentration.

18 Claims, No Drawings

OXIDATION BASE DYE COMPOSITION AND METHOD OF DYEING THEREWITH

This invention relates to a new and improved composition and method for coloring porous substrates, especially porous stone.

Innumerable compositions and methods have been heretofore proposed and employed for coloring porous substrates but only a relatively few have been applicable to the coloration of porous stone. In U.S. Pat. No. 3,494,715 issued Feb. 10, 1970 I have disclosed means in current commercial use for coloring porous stone involving applying thereto a solution of an oxidation base and a strong acid in an aqueous/water-miscible solvent medium, allowing the solution to penetrate the porous stone, and treating the penetrated stone with an aqueous solution of an oxidizing agent, e.g., 10–35% aqueous hydrogen peroxide, to produce the desired color. Such means have however not been entirely satisfactory, especially for the production of black-colored products, yielding instead undesirable grey to reddish black colorations. Other deficiencies include insufficient storage or shelf stability, difficulties in application, unduly slow rate of oxidation of the dye-treated stone, weak and/or non-uniform final colorations, unduly high light-reflective properties, and/or variations of desired black shades from gray to reddish gray, especially after storage for some time.

It is an object of this invention to provide a composition and method for coloring porous substrates, especially porous stone, which will not be subject to one or more of the above deficiencies. Other objects and advantages will appear as the description proceeds.

The attainment of the above object is made possible by this invention which includes the provision of a dye solution comprising an oxidation base, acetic acid, and about 0.2 to about 0.3 mole, per mole of said oxidation base, of a $C_{8-16}$ alkylbenzene sulfonic acid, in a volatile organic solvent medium.

The essential $C_{8-16}$ alkyl benzene sulfonic acid or mixture thereof may contain any straight or branched chain alkyl group, e.g., octyl, nonyl, hexadecyl, octadecyl, but preferably dodecyl, and may be present in proportions of about 0.02 to about 0.3, preferably about 0.06 to about 0.25, more preferably about 0.1 to about 0.2, still more preferably about 0.136, mole per mole of the oxidation base. The mechanism by which this component functions is not understood, but in its absence weak and/or off-shade colorations are produced. For example, when 4-amino-diphenylamine (ADA) is employed as the oxidation base, the final color is a weak and often reddish black instead of the relatively strong intense black obtained in its presence.

Any oxidation base or mixture thereof may be employed in the compositions of this invention for the production of any desired color, including the oxidation bases listed in said U.S. Pat. No. 3,494,715 at column 2, line 45 to column 3, line 4, which passage is incorporated herein by reference thereto. A particularly preferred oxidation base productive of a strong intense black according to this invention is ADA. These bases are generally present in the compositions of this invention in approximate weight concentrations of 1 to 15%, preferably 4 to 12%, more preferably 6 to 10%.

The preferred acetic acid is present in the compositions of this invention in proportions at least sufficient to form the acid salt of the oxidation base and preferably to provide the composition with an acidic pH. This generally requires at least 1, preferably about 1.5 to about 6, more preferably about 2 to about 4, still more preferably about 3, moles of the acid per mole of the oxidation base. Other acids may be employed such as those disclosed in said U.S. Pat. No. 3,494,715 at column 3, lines 5–11, but usually yield dye solutions of inferior quality, e.g. too viscous, less stable, precipitate-containing, etc., and some like lactic and phosphoric acids produce a much weaker color on final oxidation on the substrate.

In contrast to the 50% aqueous solvent media exemplified in the formulations disclosed in said U.S. Pat. No. 3,494,715, it has been found that substantial amounts of water in the compositions of this invention unexpectedly reduce their storage stability. Substantially anhydrous compositions are therefore preferred herein, i.e. containing no more than about 5%, preferably substantially no water at all. The volatile organic solvent medium of this invention preferably comprises at least one, preferably two, and often all three water-miscible members of the group consisting of isopropanol, diacetone alcohol and Cellosolve (ethyl ether of ethylene glycol). These solvents, especially diacetone alcohol, have been found to provide superior properties such as better solvency for the oxidation base and other components of the solution and/or improved resistance to deterioration or premature oxidation in storage. Other water-miscible solvents disclosed in U.S. Pat. No. 3,494,715 may be employed but have been found to be generally less desirable and more deficient in the aforementioned properties.

In further contrast to the water-miscible solvent media of U.S. Pat. No. 3,494,715, it has been found that inclusion of water-immiscible solvents and other materials in the solutions of this invention often provides further desirable properties and results. For example, inclusion of about 10 to about 70 wt. % of xylol, perchlorethylene and/or toluol, and/or about 5 to about 20 wt. % of mineral spirits, often provides improved solvency and stability properties. Mineral spirits further retard evaporation, thereby promoting more uniform spreading of the dye liquid and coloration of the substrate and enhanced penetration thereof. Likewise, inclusion of about 2 to about 10 wt. % of a fatty acid such as oleic acid often unexpectedly increases the rate of oxidation in the post-treatment with oxidizing agent and intensifies the color of the sighting dye discussed below.

It will be understood that the term "solution" as applied to the liquid dye compositions of this invention is inclusive of colloidal solutions and emulsions since, for example, certain solvents and other liquid components therein may be mutually immiscible. Further, since these liquid dye compositions are generally colorless, and as a further feature of this invention, there is preferably included in such compositions an effective visible amount of a sighting dye, i.e. an amount sufficient to visibly color the composition whereby when applied to the substrate, the areas treated with the dye composition become immediately apparent, thus minimizing non-uniform treatment or "holidays". Generally about 0.5 to about 5 wt. % of the dye is sufficient, although amounts outside this range could be employed if effective. The sighting dye should preferably be inert, soluble and stable in the composition, of the same color as the final color of the oxidation product of the oxidation base, and resistant to oxidation, whereby the final color is simultaneously intensified. An excellent sighting and intensifying dye for the production of black colorations, especially for compositions containing ADA, is Solvent Black 7 (Nigrosine Base N Pure). Alternatively, the sighting dye may be of a different color from, but oxidizable to colorless or to the same color as, the desired final color. This would of course require further routine experimentation, as would use of a sighting dye having, or oxidizable to, a color different from that of the oxidation product of the oxidation base, whereby the final color would comprise the colors from the sighting dye and the oxidation base.

The compositions of this invention may be prepared by thoroughly mixing the components in any desired order or sequence, preferably with the application of heat to facilitate solubilization and/or liquefaction of normally solid components such as the oxidization base, the sighting dye and/or fatty acids. The compositions may be applied uniformly or in any restricted areas of the substrate by any suitable means such as by spraying, brushing, wiping, roller coating, printing, stenciling and the like. The amount of dye composition applied to the substrate is not critical being in any particular instance sufficient to achieve the desired intensity of final color. After permitting the thus-applied dye composition to penetrate the substrate and the volatile components therein to evaporate to dampness, partial or complete dryness, usually from about 10 to about 45 minutes, the penetrated substrate is treated with an oxidizing agent in an amount and duration effective to produce the desired final color including oxidation of the oxidation base dye. As indicated above regarding the manner of applying the dye composition, the oxidizing agent is likewise applied in any suitable manner.

Any suitable oxidizing agent may be employed, for example alkali metal chlorates, chromates and per-compounds such as percarbonates, persulfates and perborates, their corresponding free acids, ferric salts, and/or alkali metal, metal, organic and/or hydrogen peroxides. Aqueous solutions are preferred, especially aqueous hydrogen peroxide. The dye compositions of this invention are more readily and more rapidly oxidized than the compositions of U.S. Pat. No. 3,494,715, being generally fully oxidized and/or developed in about 5 to about 60 minutes using relatively lower amounts of oxidizing agent such as aqueous hydrogen peroxide of about 1 to about 9, usually and conveniently about 3, wt. % concentration. Following completion of the development to final color, the colored substrate is fast to washing, rubbing and other influences and conditions and may be washed, buffed, and/or finished as desired.

Although any substrate, non-porous or porous such as wood, leather, textiles and other fibrous materials, may be colored in accordance with this invention, its greatest advantages are to be found in the coloration of natural stone in any shape, size or surface configuration such as building or structural stone, support plates for mounting machinery, scientific instruments and monuments, gravestones, floor tiles or sections, and the like. Any naturally occurring stone may be so colored, such as granite, dolomitic limestone, calcitic limestone, whitestone, dolomite, marble and the like, in addition to, for example land and aquatic animal bone and shell substrates and the like. No special pretreatment of the substrate, such as drying, roughening or the like, is needed.

The following examples are only illustrative of preferred embodiments of this invention and are not to be regarded as limitative. All amounts and proportions referred to herein and in the appended claims are by weight unless otherwise indicated:

EXAMPLE 1

|  | Parts |
| --- | --- |
| ADA[1] | 200 |
| Solvent Black 7 | 50 |
| S. Ac. 1298[2] | 50 |
| Toluol | 344 |
| Cellosolve[3] | 1,116 |
| Diacetone alcohol | 188 |
| Glacial acetic acid | 200 |
| Mineral spirits | 42 |

[1] 4-aminodiphenylamine, Uniroyal UBOP
[2] sulframinic acid 1298, dodecyl benzene sulfonic acid, Witco Chem. Co.
[3] ethylene glycol monoethyl ether The above formulation is prepared by first mixing all the ingredients except the mineral spirits, heating the mixture to about 120°–160° F. to dissolve the ADA, and then mixing in the mineral spirits. The resulting stable liquid dye composition is applied uniformly to the surface of a granite substrate by wiping as with a cotton cloth, or a sponge (e.g. acrylic or polyester). After allowing the liquid to penetrate and evaporate for about 10 to 45 minutes, the surface is uniformly treated with a 3% aqueous solution of hydrogen peroxide and allowed to set for about 5 to 60 minutes, average time about 30 minutes. At this stage the coloration is already fully developed, fast to washing, rubbing, oils, light, etc., and of a more intense, deeper black than obtainable heretofore.

TABLE I

|  | Example (Parts) | | | | |
| --- | --- | --- | --- | --- | --- |
|  | 2 | 3 | 4 | 5 | 6 |
| ADA | 200 | 200 | 200 | 200 | 200 |
| Solvent Black 7 | 50 | 50 | 50 | 50 | 50 |
| S. Ac. 1298 | 50 | 50 | 50 | 50 | 50 |
| Cellosolve | 1,209 | — | 651 | 1,209 | 1,395 |
| Diacetone alcohol | 188 | 188 | 188 | 188 | 188 |
| Oleic acid | 178 | 178 | — | — | — |
| Glacial acetic acid | 200 | 200 | 200 | 400 | 200 |
| Isopropanol | — | 1,014 | 624 | — | — |
| Mineral spirits | 350 | 350 | 350 | 350 | 350 |

When the above formulations are applied to the procedure described in Example 1 to porous granite (Silvertone, Woodbury, of Granite Co. of Vermont), substantially similar improved results are obtained. The colorations from Examples 2 and 3 are somewhat more intense, probably due to the presence of oleic acid. The coloration from Example 5 is somewhat weaker, probably due to the presence of more acetic acid.

When the above formulations and that of Example 1 are similarly applied to a less porous, denser, harder (and more difficult to penetrate) granite, the colorations are without exception still very much stronger than obtainable with the formulations of U.S. Pat. No. 3,494,715, although somewhat weaker than corresponding colorations on porous granite. Best colorations are obtained with the formulations of Example 2 and especially Example 1. The formulations of Examples 3 and 4 are more difficult to apply, probably due to the presence of relatively high amounts of the volatile isopropanol. The colorations obtained with the formulations of Examples 5 and 6 are somewhat weaker, probably due to the absence of oleic acid.

When Example 2 is repeated with substitution of the Cellosolve by butyl Cellosolve, dimethyl formamide and N-methyl pyrrolidone, respectively, the solutions turn brownish after one week storage.

TABLE II

| | Example (Parts) | | | | | | | | |
|---|---|---|---|---|---|---|---|---|---|
| | 7 | 8 | 9 | 10 | 11 | 12 | 13 | 14 | 15 |
| ADA | 200 | 200 | 200 | 200 | 200 | 200 | 200 | 200 | 200 |
| S. Ac. 1298 | 50 | 50 | 50 | 50 | 50 | 50 | 50 | 50 | 50 |
| Glacial acetic acid | 200 | 200 | 200 | 200 | 200 | 200 | 200 | 200 | 200 |
| Isopropanol | 1,482 | — | — | — | — | — | 780 | 1,482 | 780 |
| Cellosolve | — | 1,767 | — | — | 930 | 837 | 837 | — | — |
| Toluol | — | — | 1,634 | 1,462 | 774 | 688 | — | — | 774 |
| Diacetone alcohol | 188 | 188 | 188 | 188 | 188 | 188 | 188 | 188 | 188 |
| Oleic acid | — | — | — | 178 | — | 178 | 178 | 178 | 178 |
| Mineral spirits | 210 | 210 | 210 | 210 | 210 | 210 | 210 | 210 | 210 |

Solvent Black 7 is omitted from the above formulations, mainly to permit more accurate evaluation of the effect of varying components. All are applied by the procedure described in Example 1 on very hard granite (Cold Spring Granite 240 honed) with substantially improved results relative to those obtainable with the formulations of U.S. Pat. No. 3,494,715. Relatively considered, Example 14, yields the strongest coloration. The colorations of Examples 9, 10, 12, 13 and 15 are slighlty less intense. The coloration of Example 7 is still less intense, and the colorations of Examples 8 and 11 are the least intense of the group. The formulations of Example 7 (isopropanol) and of Examples 10 and 12-15 (oleic acid) provide the highest rate of oxidation on the granite.

The formulations of Examples 7-9 yield black colorations with a greenish cast. The formulations of Examples 10-12 yield colorations slightly bluer than those of Examples 7-9. The Example 7 formulation develops a bluish color in storage faster than the others which are more stable.

TABLE III

| | Example (Parts) | | | | |
|---|---|---|---|---|---|
| | 16 | 17 | 18 | 19 | 20 |
| ADA | 200 | 200 | 200 | 200 | 200 |
| Solvent Black 7 | — | — | — | 50 | 50 |
| S. Ac. 1298 | 50 | 50 | 50 | 50 | 50 |
| Glacial acetic acid | 200 | 200 | 200 | 200 | 200 |
| Cellosolve | 558 | 558 | 558 | 744 | 744 |
| Diacetone alcohol | 188 | 188 | 188 | 188 | 188 |
| Heat to dissolve, then add | | | | | |
| Isopropanol | 1,170 | — | — | 1,014 | — |
| Cellosolve acetate | — | 1,455 | — | — | — |
| BLO | — | — | 1,500 | — | — |
| Toluol | — | — | — | — | 1,118 |

When the above formulations are applied by the procedure described in Example 1 to porous and very hard granite surfaces, the colorations from Examples 19 and 20 are stronger than, and the colorations of Examples 17 and 18 are noticeably less intense than, the coloration from Example 16, colorations on the porous granite being in all cases stronger than on the very hard granite.

EXAMPLE 21

| | Parts |
|---|---|
| ADA | 200 |
| Solvent Black 7 | 50 |
| S. Ac. 1298 | 50 |
| Isopropanol | 390 |
| Diacetone alcohol | 188 |
| Glacial acetic acid | 200 |
| Oleic acid | 89 |
| Heat to dissolve ADA and Solvent Black 7, then add | |
| Isopropanol | 1,014 |
| Mineral spirits | 28 |

When applied by the procedure described in Example 1 to Barre granite, to Diamond Gray and Sierra White granite from Cold Spring Granite Co., the above formulation yields a relatively rapidly oxidized, uniformly intense black coloration.

TABLE IV

| | Example (Parts) | |
|---|---|---|
| | 22 | 23 |
| ADA | 200 | 200 |
| Solvent Black 7 | | 50 |
| S. Ac. 1298 | 50 | 50 |
| Glacial acetic acid | 200 | 200 |
| Isopropanol | 1,560 | 1,560 |

These formulations when applied to a substrate as described above start oxidizing when exposed to air only. The color develops to full strength very rapidly when topped with the aqueous hydrogen peroxide. Due to the rapid evaporation of the isopropanol, these formulations are not particularly advisable for uniform coloration of large areas of granite. They may however be employed with advantage for application, as by spraying, on more absorbent substrates calling for a reduction in penetration in favor of surface coloration, for example on wood, leather, textiles and other fibrous and/or foraminous substrates.

This invention has been disclosed with respect to preferred embodiments and it will be understood that modifications and variations thereof obvious to those skilled in the art are to be included within the spirit and preview of this application and the scope of the appended claims.

I claim:

1. A liquid dye composition comprising an oxidation base, acetic acid, and about 0.02 to about 0.3 mole, per mole of said oxidation base, of a $C_{8-16}$ alkyl benzene sulfonic acid, in a substantialy anhydrous volatile organic solvent medium.

2. A composition according to claim 1 containing an amount of acetic acid at least sufficient to form the acid salt of the oxidation base.

3. A composition according to claim 2 containing about 1 to about 15% by weight of the oxidation base.

4. A composition according to claim 3 wherein said sulfonic acid is dodecyl benzene sulfonic acid.

5. A composition according to claim 4 wherein said solvent medium contains at least one water-miscible member of the group consisting of isopropanol, diacetone alcohol, and ethyl ether of ethylene glycol.

6. A composition according to claim 5 wherein said solvent medium contains at least two such members.

7. A composition according to claim 5 further containing about 10 to about 70% by weight of toluol.

8. A composition according to claim 5 further containing about 5 to about 20% by weight of mineral spirits.

9. A composition according to claim 5 further containing about 2 to about 10% by weight of oleic acid.

10. A composition according to claim 4 further containing an effective visible amount of a colored sighting dye.

11. A composition according to claim 1 wherein said oxidation base is 4-aminodiphenylamine.

12. A process for coloring a porous substrate comprising applying thereto a composition as defined in claim 1, allowing the composition to penetrate the substrate, and treating the penetrated substrate with an aqueous solution of an oxidizing agent to produce the desired color.

13. A process according to claim 12 wherein said oxidation base is 4-aminodiphenylamine.

14. A process according to claim 13 wherein said aqueous solution contains about 1 to about 9 wt. % of hydrogen peroxide.

15. A process according to claim 12 wherein said porous substrate is natural stone.

16. A composition according to claim 4 wherein said oxidation base is 4-aminodiphenylamine.

17. A process for coloring a porous substrate comprising applying thereto a composition as defined in claim 16, allowing the composition to penetrate the substrate, and treating the penetrated substrate with an aqueous solution of an oxidizing agent to produce the desired color.

18. A process according to claim 17 wherein said porous substrate is natural stone and said aqueous solution contains about 1 to about 9 wt. % of hydrogen peroxide.

* * * * *